United States Patent [19]
Coats

[11] 4,098,119
[45] Jul. 4, 1978

[54] SIGHT-GLASS ADAPTER

[76] Inventor: William H. Coats, 2323 Webster, Woodward, Okla. 73801

[21] Appl. No.: 709,162

[22] Filed: Jul. 27, 1976

[51] Int. Cl.² ............................................. G01F 23/02
[52] U.S. Cl. ........................................ 73/323; 73/324
[58] Field of Search ................. 73/332, 324, 326, 325, 73/333, 323; 137/558, 559; 285/177

[56] References Cited

U.S. PATENT DOCUMENTS

| 640,442 | 1/1900 | Clarke | 73/324 |
|---|---|---|---|
| 1,178,836 | 4/1916 | Best | 73/332 |
| 1,307,225 | 6/1919 | West | 73/332 |
| 1,701,914 | 2/1929 | Ernst | 73/328 |
| 3,056,616 | 10/1962 | Jaros | 285/177 |

FOREIGN PATENT DOCUMENTS 1,163,414  9/1969  United Kingdom ................. 285/177

Primary Examiner—S. Clement Swisher
Assistant Examiner—Denis E. Corr
Attorney, Agent, or Firm—Clarence A. O'Brien; Harvey B. Jacobson

[57] ABSTRACT

A sight-glass adapter which may be provided in the form of a separate kit for use with existing sight-glass arrangements as currently in use with tanks and other vessels. The adapter unit of this kit provides all of the necessary elements for connection between the existing valves and the existing sight glass in order to properly hold the sight glass in a manner which will permit easy and quick access to the interior thereof for the purpose of cleaning same. The adapter includes a main body element having a threaded projection at one end thereof for receiving a sight-glass retaining nut thereon together with appropriate rubber seal and metal washer structure. The other end of the main body member has a removable screw plug for permitting quick access to the interior of the member as well as the interior of the sight glass itself. An aperture tapped on one side of the main body element receives a secondary member having a projecting screw threaded end receivable in the main body member tap with the other end of the member having a retaining collar and appropriate nut thereon for attachment to the existing valve for the sight glass. A recessed tip end with O-ring seal is also provided for the other end of this secondary member in order to form a fluid tight seal in engagement with the valve structure. A wrench receiving recess is also provided on the body of the secondary member.

1 Claim, 2 Drawing Figures

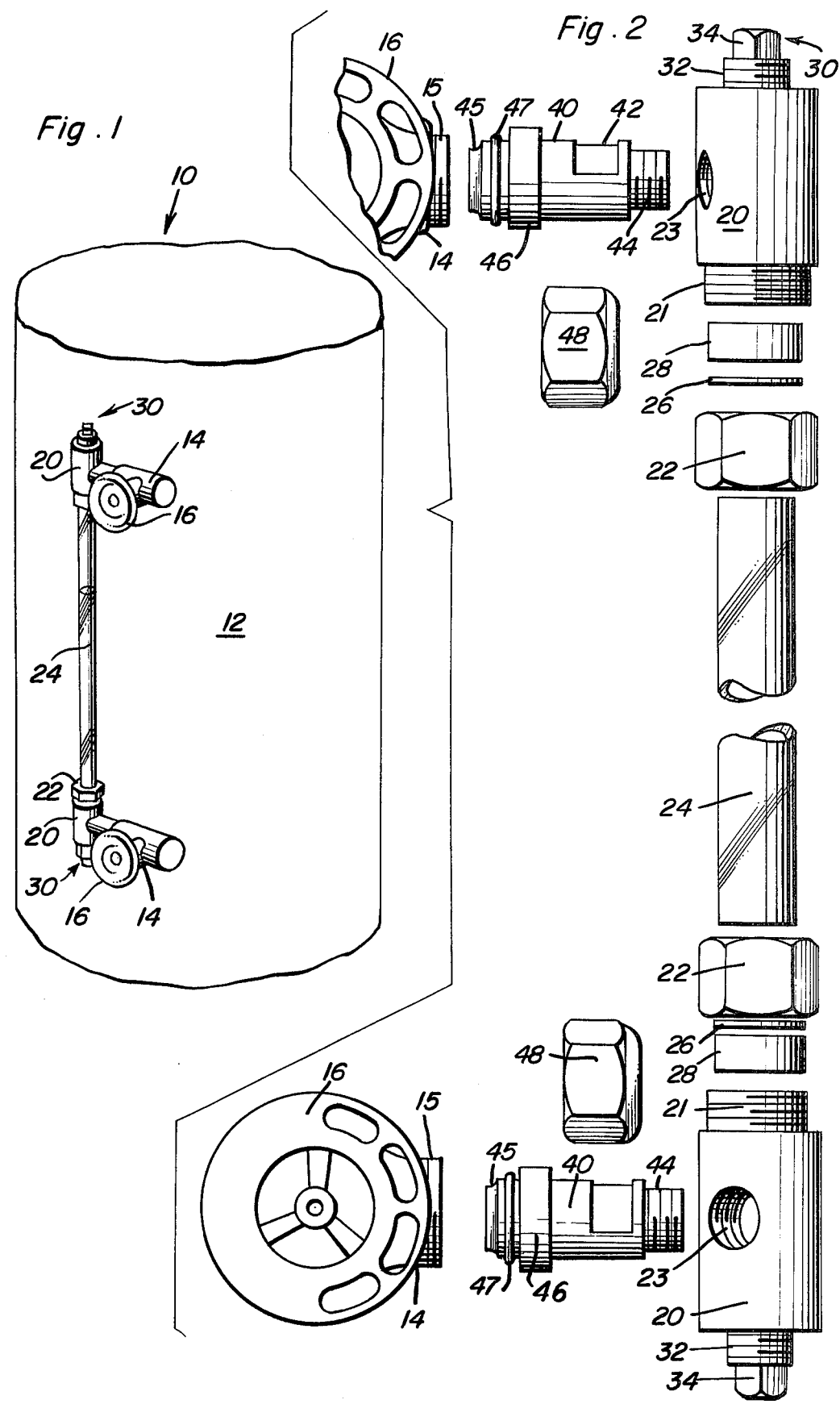

SIGHT-GLASS ADAPTER

BACKGROUND OF THE INVENTION

1. Field of the Invention

This invention relates generally to devices for permitting access to the interior of existing sight-glass devices as in use on the sides of tanks and other vessels. The reason being to permit ready and easy access to the interior of the sight glass for the purpose of cleaning same.

2. Description of the Prior Art

A common problem with known sight-glass devices is that the arrangement of same is such that ready access to the interior of the sight glass is not achievable. In order to clean a dirty or rust contaminated sight glass, it is necessary to remove one or both ends of same from the existing supporting valve structure, which often results in breakage of the glass from which the sight-glass is made.

Another problem with known type construction of sight glasses is that the valve arrangement does not permit easy disengagement of the sight glass therefrom for the purpose of cleaning and replacement of same.

Known prior art patents which may be pertinent to this invention are as follows: U.S. Pat. Nos. 311,471; 1,294,568; 2,333,397; 763,300; 1,460,873; 3,174,338.

None of these prior art devices offers the new and unique features of the invention disclosed herein.

SUMMARY OF THE INVENTION

An object of the present invention is to provide a sight-glass adapter which may be supplied in the form of a kit with the necessary components included in the kit for adapting conventional sight-glass structure as in present use to permit easy access to the interior of the sight glass per se for the purpose of cleaning and removing contaminants therefrom.

Another object of the present invention is to provide an adapter unit which may be quickly and easily connected between the existing type valve support for at least one end of a sight glass, and once this adapter unit is properly installed ready and easy access to the interior of the sight glass will be available.

A further object of this invention is to provide an adapter which may be supplied in appropriate sizes to fit all type valves and sight-glass structure in use today.

A still further object of this invention is to provide a sight-glass adapter which has tight sealing O-ring and seal components supplied therewith for easy adaptation of existing sight-glass mechanism to an offset type support so as to make the interior of the sight glass readily accessible and yet maintain fluid tight integrity of all of the connections.

An additional further object of this invention is to provide a sight-glass adapter which has components of conventional standard sizes with the main and secondary body members being easily and readily manufactured at relatively low cost. This will enable mass production and distribution of the adapter with minimum of expense.

The big problem with existing and conventional type sight-glass structures is that while the valve mechanism and sight glass itself function quite well to indicate the level of liquid within a tank or other vessel as is intended for such devices, a big problem has been in the fact that often times the interior of the glass becomes contaminated or coated with contaminants such as rust particles and the like which prevent the easy distinguishment of the liquid level within the sight glass and the associated tank. Therefore, a method and structural adapter for permitting easy access to the interior of the sight glass member itself for the purpose of cleaning same is much needed.

Also, most of the valve structures for known type sight glass mechanisms are so constructed that it is quite difficult to remove the sight glass for the purpose of either cleaning or replacement of same. With the adapter unit of this invention installed, such removal and replacement of sight-glass tubes becomes extremely quick and easy.

The basic components of the sight-glass adapter which normally would be supplied in kits of two with the necessary sizes for the conventional sight-glass members and valves as in the field today. A main body member is provided having a threaded projection at one end and central aperture therein for alignment with and retention of one end of the sight glass itself, together with appropriate retaining nut, rubber seal, and optional metal washer for positively fastening and holding in liquid tight manner one end of the sight glass to the adapter unit. The other end of the main body adapter unit is appropriately tapped for reception of a plug which can easily be removed whenever it is necessary to reach the interior of the sight glass for the purpose of cleaning and the like. A secondary body member is provided which is appropriately fastened through a side opening in the primary body member by a tap and threaded aperture or the like. This secondary body member has a retention collar and valve engaging tip end with an appropriate O-ring provided thereon for reception and retention in the existing sight-glass valve structure by an appropriate locking nut. A wrench engaging recess is also provided on this secondary member for use in assemblying same to the main body member.

The main and secondary body members together with the closure plug, O-ring seal, rubber seal, metal washer and appropriate attachment nuts all would be supplied in kit form, normally at least two complete units being included in each kit and many kits including a number of such components for ready field adaptation and modification of existing sight-glass mechanisms.

These, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the sight-glass adapter as in use on the side of a liquid containing vessel.

FIG. 2 is an exploded view of the component parts of two of the sight-glass adapters as arranged for connection with existing sight-glass structures.

DESCRIPTION OF THE PREFERRED EMBODIMENT

Referring to FIG. 1 of the drawings, reference numeral 10 indicates in general, the sight-glass adapter of this invention as applied to conventional existing sight-glass mechanism. A tank or vessel is indicated by reference numeral 12, being appropriately tapped and having mounted thereon sight-glass valves 14 with handles 16 for turning the valves on or off all as is conventional with such sight-glass mechanisms. Normally, the sight glass 24 itself would extend directly between the openings in the valves 14 and be directly connected and held by same. This in itself is the problem. With such a mounting, the only way the interior of the glass, or the transparent member 24, may be cleaned is to remove one or both ends of said sight glass 24 from the existing valves 14. Once the mechanism has been in use for a while, and as it becomes corroded and contaminated with age, removal and access to the interior of the glass 24 becomes quite difficult if not impossible. Most times, upon attempting to loosen and remove the glass, it is broken or damaged and has to be entirely replaced. These sight-glass members are relatively expensive, and also somewhat difficult to obtain, and this compounds the problem. Therefore, a means for permitting ready access to the interior of this sight glass without removing one or both ends from the existing valve structure, is much needed. That is the purpose of this invention.

As can be seen in the Figures, a main adapter member 20 is attached in an offset side relationship to the existing valves 14 for appropriately holding the sight-glass member 24 also in offset position from the main valves 14. Removing a plug member 30 in the main adapter body permits easy access to the interior of the adapter glass 24, and by use of a small swab or piece of cleaning material on the end of a wire, such as a stretched out coat hanger rod, or the like, the interior of the glass may be very quickly and easily cleaned of any contaminants coated thereon.

Looking at FIG. 2 of the drawings, the adapter unit of this invention will now be described in detail. A main body member 20 has a projection 21 at one end thereof which is appropriately threaded for reception of a sight-glass retaining nut 22. The nut 22 obviously has complementary threads to those provided on the threaded projection 21. A central aperture extends longitudinally of the main member 20, not shown, as is necessary for this device to be used as intended. The upper end of this longitudinal aperture is appropriately tapped for reception of a closure plug 30. This closure plug 30 has a complementary threaded portion 32 which fits into the threaded end of the central aperture and a wrench engaging square or other shaped portion 34. As can be easily visualized, once this plug 30 is removed, a straight-through opening is provided to the central interior of sight glass 24 so that a swab or other cleaning device may be easily inserted from the end of the adapter unit 20 through the interior of the sight glass. A flexible resilient seal member 28 of rubber or the like is also provided which also may have an optical metal washer 26. As can also be easily visualized, once the end of the sight glass 24 is mounted adjacent and in alignment with the central aperture of the main body 20, by tightening the nut 22, pressure is exerted through washer 26 upon the deformable seal member 28 to form a fluid tight connection of the sight glass end with the adapter member. A corresponding adapter member also is provided for the other end of the sight glass as it is shown in FIG. 2.

The secondary body member 40 is provided with a wrench engaging slot 42 for the purpose of tightly assembling of same to the main body 20 and also is provided with a projecting threaded member 44 for engagement with a side tapped aperture 23 in the main body member. This side tap aperture 23 obviously must connect with the longitudinal central aperture through the main body member.

On the other end of the secondary body member is provided a recessed projection 45 for engaging with the interior of the aperture provided in valve 14. A fluid seal O-ring 47 is also provided on this end of the seconary body member together with a extending collar 46. The collar 46 together with the nut 48 provides the tightening connection for engagement with screw threaded projection 15 of the valve 14.

As can be easily visualized by looking at the Figures, the nuts 48 will attach the secondary members 40 to the upper and lower valves 14 for holding the main adapter members 20 in proper side offset relationship to the valves. Thus, the function of the valves and the sight glass is the same as before the modification is made. However, now when the glass needs to be cleaned interiorly thereof, merely by removing one or both of the plugs 30, fast easy access to the entire length of the sight glass interior is readily achieved.

This adapter unit may be supplied in simple, easy, and ready-to-install kit form by having at least two of the main body members 20 included together with the plugs 30 and seals 28. Also, the secondary members 40 would normally be supplied at least two for each kit, and may involve more than this number if different sizes of same for various valve sizes are supplied with the kit.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalent may be resorted to, falling within the scope of the invention.

What is claimed as new is as follows:

1. A sight-glass adapter unit comprising; a main body member of tubular shape, a central opening extending longitudinally of the main body member and opening to each end thereof, one end of the opening for alignment with the end of a sight glass, means associated with this end of the main body for retaining in liquid tight manner the end of a sight glass fastened to this end portion, the other end of the main body member having a removable closure means associated therewith, and additional means for connecting the main body member to a valve on a vessel on which the sight glass is to be used, the means associated with the end of the sight glass for retention thereof including a threaded projection on the one end of the main body member, a flexible and resilient sealing member engageable around the tip of the sight glass, and a removable nut with a central aperture just slightly larger than the circumference of the sight glass and threaded for tightening on the threaded projection of the main body member for compressing the resilient seal member to form a liquid tight seal, the removable closure means for the other end of the main body member consisting of a threaded plug member with wrench engaging projection thereon for reception in a threaded aperture in the main body member, the additional means for connecting the main body member to an existing valve consisting of an elongated secondary body member separate from the main body member and having a threaded projection at one end thereof for reception in a threaded side aperture in the main body member and permitting attachment and removal of the main body member to the valve with the liquid tight seal of the sight glass intact, a central aperture extending through the secondary body member for permitting liquid flow therethrough, a valve engaging projection on the other end of the secondary body member, a retaining collar provided thereon, sealing means provided thereon, and a retaining nut for association with the collar and the existing valve to retain the secondary body member in liquid tight engagement with the valve, the retaining nut being spaced from the main body member and the secondary body member having provided thereon a wrench engaging slot disposed between the nut and main body member for facilitating mounting and removal of the secondary body member.

* * * * *